United States Patent Office 3,230,228
Patented Jan. 18, 1966

3,230,228
PANTHENOL DERIVATIVES AND PROCESSES FOR THEIR PREPARATION
Gustav Erlemann, Riehen, Waldemar Guex, Bottmingen, and Otto Schnider, Basel, Switzerland, assignors to Hoffmann-La Roche Inc., Nutley, N.J., a corporation of New Jersey
No Drawing. Filed Apr. 16, 1963, Ser. No. 273,271
Claims priority, application Switzerland, Mar. 30, 1961, 3,803/61
10 Claims. (Cl. 260—295)

The present invention relates to novel ethers and to their manufacture and use. More particularly, the present invention relates to novel ethers and thioethers of panthenol and acid addition and quaternary salts thereof, to processes for their preparation, and to novel cosmetic and pharmaceutical preparations containing them.

This application is a continuation-in-part application of copending application Serial No. 174,287, filed February 19, 1962, now abandoned, for "Panthenol Derivatives and Processes for Their Preparation," to Gustav Erlemann, Waldemar Guex, and Otto Schnider.

The novel panthenol ethers and thioethers of the invention have the formula:

(I) 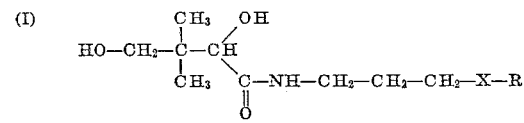

wherein X represents an oxygen or sulfur atom, and R represents an alkyl radical (e.g. methyl, ethyl, isopropyl, n-decyl, cetyl, etc.), preferably a straight chain alkyl radical having from 1 to 16 carbon atoms; an alkenyl radical (e.g. alkyl, phytyl, geranyl, etc.), preferably an alkenyl radical having from 1 to 20 carbon atoms; a dialkylaminoalkyl radical, preferably a diloweralkyl-aminoloweralkyl radical (e.g. dimethylaminoethyl, diethylaminoethyl, etc.); tetrahydrofurfuryl, β-pyridylmethyl; menthyl; or guaiacyl radical. The preferred compound is that in which X is an oxygen atom and R is an ethyl radical.

The above compounds exhibit pantothenic acid activity on peroral or percutaneous administration and are therefore useful as cosmetic agents and as pharmaceuticals. In contrast to the known acyl-panthenols, the novel compounds of the invention are very stable—such stability being of great importance in cosmetic and pharmaceutical preparations.

The present invention also relates to processes for the manufacture of the novel ethers and their salts. The compounds of Formula I can be prepared by reacting racemic or optically active α,γ-dihydroxy-β,β-dimethyl-butyrolactone with an amine of the formula (II) 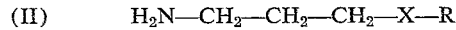 H₂N—CH₂—CH₂—CH₂—X—R wherein the symbols X and R have the same meaning as in Formula I, and converting the resulting basic ether or thioether into an acid addition or quaternary salt if desired.

The amines of Formula II can conveniently be prepared by the addition of an appropriate alcohol orthiol to acrylonitrile followed by hydrogenating the cyano group in the addition product.

The process of the invention is advantageously carried out without the use of a solvent. Upon mixing both reaction components at room temperature, the reaction immediately begins. It is advantageous to use equimolar amounts of the reaction components. After the initial evolution of heat has died down, the reaction mixture is preferably maintained at a temperature in the range of about 40 to about 80° C. for a few hours. In the preferred amine starting material X is oxygen and R is an ethyl radical.

The novel basic ethers and thioethers of the invention are converted into their acid addition salts by treatment with pharmaceutically acceptable acids such as mineral acids, for example, hydrohalic acids (such as hydrochloric acid and hydrobromic acid), nitric acid, sulfuric acid and phosphoric acid, or into their quaternary salts by treatment with quaternizing agents such as alkyl (preferably lower alkyl) halides and alkyl (preferably lower alkyl) sulfates (for example, methyl bromide, ethyl iodide and dimethyl sulfate).

The novel ethers and thioethers of the invention, which are obtainable in quantitative yield by the foregoing process, are either colorless liquids or are low-melting crystalline solids. They can be purified by distillation in a high vacuum but it should be borne in mind that the optically active compounds may be partially or wholly racemized by such procedure. They possess excellent water-solubility; the lower members being miscible with water in all proportions while the higher members are still very soluble. They are readily soluble in the common organic solvents (e.g. ethyl alcohol, ether, ethyl acetate and acetone) and the solutions obtained are especially suitable for percutaneous application (e.g. cosmetic preparations). They can be made up into cosmetic preparations (e.g. hairwashes, hair oils, salves and preparations for the care of the skin) in the usual manner using cosmetic excipients, e.g., aqueous alcohols, paraffin oil, fatty substances, etc. Perfuming agents and other useful additives may also be incorporated.

The novel substances aforesaid may also be used in pharmaceutical preparations which contain them in admixture with a pharmaceutical organic or inorganic inert carrier material suitable for enteral or parenteral administration (e.g. water, gelatin, lactose, starch, magnesium stearate, talc, vegetable oils, gums, polyalkylene glycols, vaseline and the like). The preparations may be made up in solid form (e.g. as tablets, troches, suppositories or capsules) or in liquid form (e.g. as solutions, suspensions or emulsions). If required, they may be sterilized and/or contain additive materials such as preserving, stabilizing, wetting or emulsifying agents, salts for variation of the osmotic pressure or buffers. They may also contain other therapeutically valuable materials.

In order that the process of the invention may be more clearly understood and readily carried into effect, the following examples are given by way of illustration.

EXAMPLE 1

To 130 g. of D(—)-α-hydroxy-β,β-dimethyl-γ-butyrolactone are added in one portion at ca. 20° C. while stirring 89 g. of 3-methoxypropyl amine. The reaction occurs immediately with self-heating. The temperature rises to about 50° C. and after the reaction has died down the mixture is maintained for a further 2 hours at the same temperature. The D(+)-α,γ-dihydroxy-N-(3-methoxypropyl)-β,β-dimethyl-butyramide [methyl ether] which is obtained in quantitative yield is a colorless liquid, readily soluble in water and the common organic solvents (e.g. alcohols, ketones, diethyl ether; $[\alpha]_D^{20}=+28.0°$ (c.= 3.0075 in water). By distillation in high vacuum partial racemization occurs.

The 3-methoxy-propyl amine is prepared by catalytic hydrogenation of 3-methoxy-propionitrile in methanol in the presence of ammonia; boiling point=114°–116° C./ 760 mm.

In an analogous manner there are prepared from 3-ethoxy-propyl amine (boiling point 130°–132° C./760 mm.) the ethyl ether, $[\alpha]_D^{20}=+27.8°$ (c.=2.8935 in water); from 3-n-decyloxy-propyl amine (boiling point 145°–147° C./11 mm.) the n-decyl ether, $[\alpha]_D^{20}=$ +28.75° (c.=3.1125 in methanol); from 3-tetrahydrofurfuryloxy)-propyl amine (boiling point 100°–102° C./10 mm.) the tetrahydro-furfuryl ether, $[\alpha]_D^{20}=+20.01°$ (c.=3.135 in water; and from 3-(o-methoxy-phenoxy)-propyl amine (boiling point 144°–147° C./10 mm., melting point of the hydrochloride 123°–124° C.) the guaiacol ether, $[\alpha]_D^{20}=+26.29°$ (c.=3.05 in methanol).

EXAMPLE 2

115 g. of 3-allyloxy-propyl amine are mixed with 130 g. of D(—)-α-hydroxy-β,β-dimethyl-γ-butyrolactone while stirring. The temperature rises from 26° to 45° C. with the immediate commencing of the reaction. After the reaction has died down, the mixture is maintained for two hours at 50° C. The D(+)-α,γ-dihydroxy-N-(3-allyloxy-propyl)-β,β-dimethyl-butyramide [allyl ether] is miscible with water and ether in all proportions; $[\alpha]_D^{30}=+18.32°$ (c.=3.0075 in water).

The 3-allyloxy-propyl amine results by the reduction of 3-allyloxy-propionitrile with lithium aluminium hydride; boiling point 47°–49° C./11 mm.

In an analogous manner there is prepared from 3-geranyloxy-propyl amine (boiling point 138°–140° C./10 mm.) the geranyl ether, $[\alpha]_D^{20}=+27.5°$ (c.=3.086 in methanol); and from 3-phytyloxy-propyl amine (boiling point 168°–170° C./0.04 mm.) the phytyl ether, $[\alpha]_D^{20}=+13.37°$ (c.=3.035 in methanol).

EXAMPLE 3

130 g. of D(—)-α-hydroxy-β,β-dimethyl-γ-butyrolactone are added in one portion to 119 g. of 3-ethylthio-propyl amine while stirring. The reaction occurs immediately and the temperature rises from 25° to 50° C. After the reaction has died down, the mixture is maintained for a further 3 hours at 50° C. The D(+)-α,γ-dihydroxy-N-(3-ethylthio-propyl)-β,β-dimethyl-butyramide [ethyl thioether] is readily soluble in water and the common organic solvents; $[\alpha]_D^{20}=+21.85°$ (c.=3.478 in water).

The 3-ethylthio-propyl amine is obtained by the reduction of 3-ethylthio-propionitrile with lithium aluminium hydride; boiling point 70°–72° C./11 mm.

EXAMPLE 4

130 g. of D(—)-α-hydroxy-β,β-dimethyl-γ-butyrolactone is stirred with 174 g. of 3-(diethylaminoethoxy)-propyl amine. The reaction begins immediately, the temperature rises from 25° to 50° C. and, after the reaction has died down, the mixture is maintained for a further 2 hours at this temperature. The diethylaminoethyl ether is colorless, readily soluble in water with a strongly alkaline reaction, and readily soluble in organic solvents. With acids it forms soluble neutral salts; $[\alpha]_D^{20}=+20.64°$ (c.=3.112 in water) for the base; $[\alpha]_D^{20}=+17.85°$ (c.=10 in water) for the hydrochloride.

EXAMPLE 5

To 130 g. of D(—)-α-hydroxy-β,β-dimethyl-γ-butyrolactone are added in one portion while stirring 213.3 g. of L(—)-3-menthyloxypropyl amine. The temperature rises immediately to 48° C. and the mixture is then maintained at 75° C. for 2 hours by warming. The viscous reaction product is dissolved in 500 ml. of low boiling petroleum ether and allowed to stand in ice to complete crystallization. The product is filtered off under suction and dried in a vacuum. The D(—)-α,γ-dihydroxy-N-(3-menthyloxypropyl)-β,β-dimethyl-butyramide [L(—)-menthyl ether] formed melts at 52°–54° C.; $[\alpha]_D^{20}=-28.21°$ (c.=3 in methanol).

The L(—)-3-menthyloxy-propyl amine is prepared by catalytic hydrogenation of L(—)-3-menthyloxy-propionitrile (boiling point 161°–163° C./18 mm. in the presence of ammonia (boiling point 145°–147° C./16 mm.); $[\alpha]_D^{20}=-88.04°$ (c.=3.1 in methanol).

EXAMPLE 6

130 g. of D(—)-α-hydroxy-β,β-dimethyl-γ-butyrolactone are added to 146 g. of 3-(dimethylaminoethoxy)-propyl amine, whereupon immediate liquefaction and warming occurs. The mixture is maintained for a further 2 hours at 50° C. The colorless, slightly liquid dimethylaminoethyl ether is obtained in quantitative yield.

To a solution of 276 g. of this ether in 1000 ml. of acetone are added 95 g. of methyl bromide dissolved in 500 ml. of acetone. The temperature rises to 48° C. whereupon the oily bromocholine ether formed separates out. The precipitation is completed by the addition of ether. The bromocholine ether is colorless and readily soluble in water; $[\alpha]_D^{20}=+16.25°$ (c.=3.25 in water).

The 3-(dimethylaminoethoxy)-propyl amine is prepared by catalytic hydrogenation of 3-(dimethylaminoethoxy)-propionitrile (boiling point 118° C./17 mm.) in the presence of ammonia (boiling point 93°–94° C./19 mm.).

EXAMPLE 7

To 6.5 g. of D(—)-α-hydroxy-β,β-dimethyl-γ-butyrolactone are added at room temperature while stirring 14.95 g. of 3-cetyloxypropyl amine. The reaction occurs immediately with self-heating. The temperature rises to 54° C. and after the reaction has died down, the mixture is maintained for further 2 hours at the same temperature while stirring. The reaction mixture is then allowed to stand for 2 days at room temperature. The D(+)-α,γ-dihydroxy-N-(3-cetyloxypropyl) - β,β-dimethylbutyramide (cetyl ether) which is obtained in quantitative yield is a colorless wax-like substance which is readily soluble in the common organic solvents (e.g. alcohols); $[\alpha]_D^{20}=+23.5-23.8°$ (c.=3 in methanol).

The 3-cetyloxy-propyl amine is prepared by catalytic hydrogenation (with Raney nickel) of 3-cetyloxy-propionitrile in methanol in the presence of ammonia; boiling point=210–213° C./10 mm.; melting point approximately 30° C.

The 3-cetyloxy-propionitrile is obtained by reaction of cetyl alcohol with acrylonitrile; melting point=51–52° C.

EXAMPLE 8

To 39 g. of D(—)-α-hydroxy-β,β-dimethyl-γ-butyrolactone are added 49.8 g. of 3-(β-pyridylmethoxy)-propyl amine of the formula

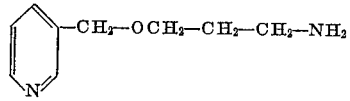

while stirring. The reaction occurs with self-heating. The temperature of the reaction mixture rises to about 50° C. After the reaction has died down, the mixture is maintained at this temperature for a further 30 minutes, after which the mixture is allowed to stand for 48 hours at room temperature. The D(+)-N-(α,γ-dihydroxy-β,β-dimethyl - butyryl)-3-(β-pyridylmethoxy)-propyl amine has the formula

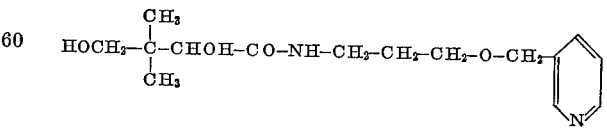

$[\alpha]_D^{20}=+15.2°$ (c.=3.15 in water).

The 3-(β-pyridylmethoxy)-propyl amine is obtained by catalytic hydrogenation (with Raney nickel) of 3-(β-pyridylmethoxy)-propionitrile in methanolic ammonia; boiling point=163–165° C./18 mm.

The 3-(β-pyridylmethoxy)-propionitrile is obtained by reaction of β-(hydroxy-methyl)pyridine with acrylonitrile; boiling point=177–181° C./10 mm.

The following are examples of the way in which the novel substances of the invention may be made up into cosmetic and/or pharmaceutical preparations:

Example A

1–5 parts by weight of the ethylether of Example 1 are dissolved in 100 g. of 50 percent aqueous ethyl or isopropyl alcohol with slight warming. The mixture is colored and perfumed according to desire.

After cooling, it is made up to 1000 parts by volume with the corresponding 50 percent alcohol/water mixture and there is obtained an active preparation for the treatment of the scalp and the hair.

Example B

1–5 g. of the phytyl ether of Example 2 are dissolved in 100 g. of paraffin oil with slight warming. It can be colored and perfumed according to desire. Subsequently, the solution is made up to 1000 g. with paraffin oil. There is thus obtained an active hair oil which is especially suitable for the treatment of dry scalp, dry dandruff and brittle hair.

Example C 5.00 g. of glycerine monostearate, 1.00 g. of cetyl alcohol, 1.00 g. of lanolin, 10.00 g. of isopropyl-myristal, 10.00 g. of aceto stearate, 5.00 g. of beeswax and 20.00 g. of Hostaphat KL 340 [(ethoxylated fatty alcohol)/(phosphoric acid ester)] are warmed to 60° C. Subsequently, a solution of 5.00 g. of the ethyl ether of Example 1 is introduced into the melt. While stirring, 918 g. of water are slowly worked in at 50° C. The emulsion can be perfumed and colored according to desire. There is thus obtained an agent for the treatment of the hands which is particularly suitable for the treatment of rough, dry and cracked skin.

Example D 30.00 g. of glycerine monostearate, 20.00 g. of stearyl alcohol, 20.00 g. of cetyl alcohol, 20.00 g. of isopropyl-myristal, 10.00 g. of lanolin, and 30.00 g. of Hostaphat KL 340 [(ethoxylated fatty alcohol)/(phosphoric acid ester)] are melted at 60° C. A solution of 5.00 g. of the ethyl ether of Example 1 and 5.00 g. of the ethyl thioether of Example 3 in 860 g. of water is slowly stirred into this melt at 50° C. This emulsion, which is especially suitable for the treatment of dry and impure facial skin, can be colored and perfumed according to desire.

Example E

There is manufactured a salve which contains 4 parts percent of cetyl alcohol, 10 parts percent of lanolin and 86 parts percent of white vaseline. 75 g. of this salve is allowed to mellow at 40° C.—whereupon a mixture of 5 g. of panthenol ethyl ether and 20 g. of water is emulsified in under mechanical machining.

Example F 5 g. of panthenol ethyl ether are admixed with 45 g. of water. 10 g. of polyoxyethylene sorbitol monostearate (Mixture A) are dissolved in this mixture while stirring at 70° C. 30 g. of hydrogenated peanut oil and 10 g. of glycerine are melted together and likewise warmed to 70° C. (Mixture B). Mixtures A and B are then mixed at 70° C. and emulsified. The emulsified mixture is cooled down with constant stirring until it has attained a salve-like consistency.

Example G

A lotion for protection against sunburn is manufactured by heating a mixture of 90 g. of Hostaphat KL 340, 50 g. of peanut oil, 50 g. of hydrogenated peanut oil, 20 g. of glycerine monostearate, 10 g. of beeswax, 20 g. of the cetyl ether of Example 7 and 25 g. of a tannic acid ester to 70° C. and emulsifying said mixture in 730 g. of water.

Example H

A salve-like preparation for improving blood circulation is manufactured by heating a mixture of 70 g. of Hostaphat KL 340, 200 g. of peanut oil, 120 g. of glycerine monostearate, 30 g. of beeswax and 50 g. of lanolin to 70° C. and emulsifying said mixture in a solution of 30 g. of the β-pyridylmethyl ether of Example 8 in 500 g. of water.

We claim:

1. A panthenol ether of the formula

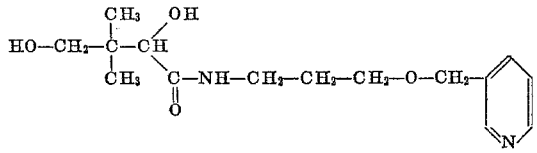

2. A panthenol ether of the formula

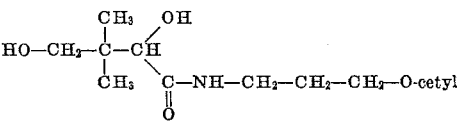

3. A compound having the formula

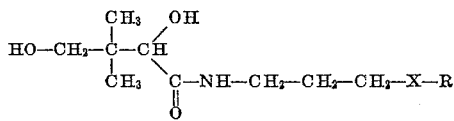

wherein X is a member selected from the group consisting of oxygen and sulfur atoms and R is $C_1$–$C_{20}$ alkenyl.

4. A compound selected from the group consisting of
   (a) a compound of the formula

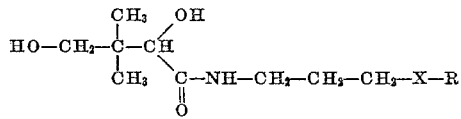

wherein X is a member selected from the group consisting of oxygen and sulfur atoms and R is diloweralkylaminoloweralkyl
   (b) an acid addition salt thereof with a pharmaceutically acceptable acid, and (c) a quaternary salt thereof selected from the group consisting of lower alkyl halide and lower alkyl sulfate quaternary salts.

5. A compound having the formula

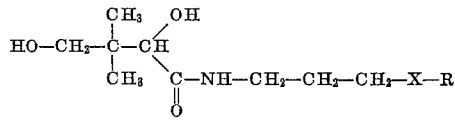

wherein X is a member selected from the group consisting of oxygen and sulfur atoms and R is tetrahydrofurfuryl.

6. A compound selected from the group consisting of
   (a) a compound having the formula

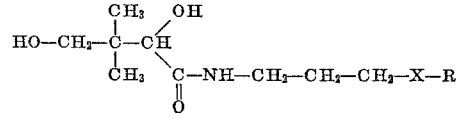

wherein X is a member selected from the group consisting of oxygen and sulfur atoms and R is β-pyridylmethyl
   (b) an acid addition salt thereof with a pharmaceutically acceptable acid, and (c) a quaternary salt thereof selected from the group consisting of lower alkyl halide and lower alkyl sulfate quaternary salts.

7. A compound having the formula

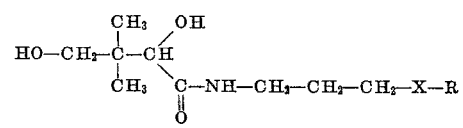

wherein X is a member selected from the group consisting of oxygen and sulfur atoms and R is menthyl.

8. A compound having the formula

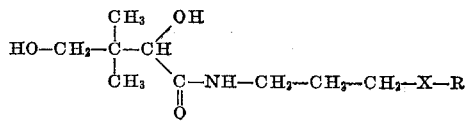

wherein X is a member selected from the group consisting of oxygen and sulfur atoms and R is guaiacyl.

9. A panthenol ether of the formula

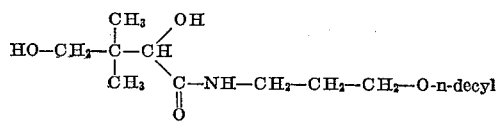

10. A panthenol ether of the formula

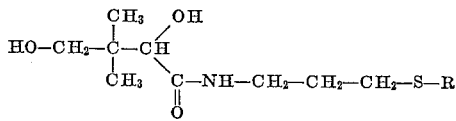

wherein R is a straight chain alkyl radical having from 1 to 16 carbon atoms.

References Cited by the Examiner

UNITED STATES PATENTS

| | | | |
|---|---|---|---|
| 3,016,334 | 1/1962 | Lewis | 167—91 |
| 3,025,323 | 3/1962 | Rose et al. | 260—561 |
| 3,051,751 | 8/1962 | Levis et al. | 260—561 |
| 3,060,097 | 10/1962 | Fellows | 167—91 |

OTHER REFERENCES

Fissekis et al.: "J. Med. Pharm. Chem.," vol. 2, No. 1, pp. 47–56 (1960).

WALTER A. MODANCE, *Primary Examiner.*

NICHOLAS S. RIZZO, *Examiner.*